United States Patent
Zhi et al.

(10) Patent No.: US 11,263,062 B2
(45) Date of Patent: Mar. 1, 2022

(54) API MASHUP EXPLORATION AND RECOMMENDATION

(71) Applicant: FUJITSU LIMITED, Kawasaki (JP)

(72) Inventors: Qiyu Zhi, Sunnyvale, CA (US); Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 16/269,490

(22) Filed: Feb. 6, 2019

(65) Prior Publication Data

US 2020/0250015 A1    Aug. 6, 2020

(51) Int. Cl.
  G06F 9/54        (2006.01)
  G06F 16/9038  (2019.01)
  G06F 16/958    (2019.01)
  G06F 16/955    (2019.01)
  G06F 16/901    (2019.01)

(52) U.S. Cl.
  CPC .......... G06F 9/541 (2013.01); G06F 16/9027 (2019.01); G06F 16/9038 (2019.01); G06F 16/9566 (2019.01); G06F 16/972 (2019.01)

(58) Field of Classification Search
  CPC .... G06F 9/541; G06F 16/972; G06F 16/9027; G06F 16/9038; G06F 16/9566
  See application file for complete search history.

(56) References Cited

U.S. PATENT DOCUMENTS

| | | | | |
|---|---|---|---|---|
| 10,296,535 B2* | 5/2019 | Li | ...................... | G06F 16/5866 |
| 10,474,457 B1* | 11/2019 | Pham | .................. | G06F 16/9535 |
| 10,606,658 B2* | 3/2020 | Masuda | ................ | G06F 9/5072 |
| 2004/0103100 A1* | 5/2004 | Levine | ..................... | G06F 16/20 |
| 2010/0333203 A1* | 12/2010 | Tsviatkou | ............. | G06F 21/563 726/23 |
| 2011/0202905 A1* | 8/2011 | Mahajan | ................... | G06F 8/43 717/140 |
| 2015/0095923 A1* | 4/2015 | Sarid | ........................ | G06F 8/30 719/328 |
| 2016/0239546 A1* | 8/2016 | Cuomo | ................ | G06F 16/248 |
| 2017/0091242 A1* | 3/2017 | Shukla | ................ | G06F 16/2246 |
| 2017/0102925 A1* | 4/2017 | Ali | ............................ | G06F 8/30 |
| 2018/0026943 A1* | 1/2018 | Call | ........................ | H04L 63/02 726/11 |
| 2018/0165135 A1 | 1/2018 | Bahrami et al. | | |

(Continued)

OTHER PUBLICATIONS

Lee, ("Semantically Enable Data Mashups using Ontology Learning Method for Web APIs"), 2012, pp. 304-309.*
U.S. Appl. No. 16/009,123, filed Jun. 14, 2018.

*Primary Examiner* — Doon Y Chow
*Assistant Examiner* — Phuong N. Hoang
(74) *Attorney, Agent, or Firm* — Maschoff Brennan

(57) ABSTRACT

A method may include collecting a plurality of computer-readable source code from an application programming interface (API) repository. The method may also include performing API call code slicing on the computer-readable source code. The method may also include extracting an API host and an endpoint for each of the API call codes identified in the API call code slicing. The method may also include compiling an API mashup database based on the extracted API host and endpoints. Furthermore, the method may also include providing a recommended API mashup of the API mashup database in a user interface.

18 Claims, 10 Drawing Sheets

(56) References Cited

U.S. PATENT DOCUMENTS

| | | |
|---|---|---|
| 2018/0119977 A1 | 5/2018 | Goel et al. |
| 2018/0129544 A1* | 5/2018 | Ekambaram ............ G06F 9/541 |
| 2018/0232444 A1* | 8/2018 | Duesterwald .......... G06F 16/93 |
| 2019/0004872 A1 | 1/2019 | Liu et al. |
| 2019/0004873 A1 | 1/2019 | Liu et al. |
| 2019/0129773 A1* | 5/2019 | Suter ..................... G06F 9/5072 |
| 2019/0227794 A1* | 7/2019 | Mercilie ............. G06F 9/45504 |

* cited by examiner

API MASHUP EXPLORATION AND RECOMMENDATION

FIELD

The embodiments discussed in the present disclosure are related to a system and method for exploring application programming interface (API) mashups and, in particular, recommending a particular API mashup.

BACKGROUND

An API is a set of protocols, commands, definitions, and tools for creating application software. An API may specify how software components should interact and how APIs are used when programming graphical user interface (GUI) components or implementing services or functions. Among all different types of APIs, such as programming language APIs, database APIs, etc., we mainly use web APIs as examples to illustrate the method described in this invention. The web API is a programmatic interface with one or more publicly exposed endpoints, which specify where resources can be accessed by third party software. A web API is exposed via the web, most commonly by means of an HTTP-based web server. The request-response message system defined for a web API is typically expressed in JavaScript Object Notation (JSON) or Extensible Markup Language (XML). In some instances, API mashups are used as a plurality of APIs functioning together in order to provide new or value-added services.

APIs and API mashups are used in all kinds of business and are generally used by companies to integrate various software into their products efficiently and inexpensively. One difficulty, however, is that with the vast amount of APIs and API mashups which are available, it is often difficult for software developers to find the API mashup which best fulfills their particular needs for any given project. This can lead to wasted time and energy as the developers may be forced to spend valuable time either developing new API mashups or searching for existing functional API mashups.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method which may include collecting a plurality of computer-readable source code from an application programming interface (API) repository. The method may also include performing API call code slicing on the computer-readable source code. The method may also include extracting an API host and an endpoint for each of the API call codes identified in the API call code slicing. The method may also include compiling an API mashup database based on the extracted API host and endpoints. Furthermore, the method may also include providing a recommended API mashup of the API mashup database in a user interface.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 6-10 illustrate examples of a user interface which may be used to navigate an API database to identify a recommended API mashup.

DESCRIPTION OF EMBODIMENTS

Figure 1:
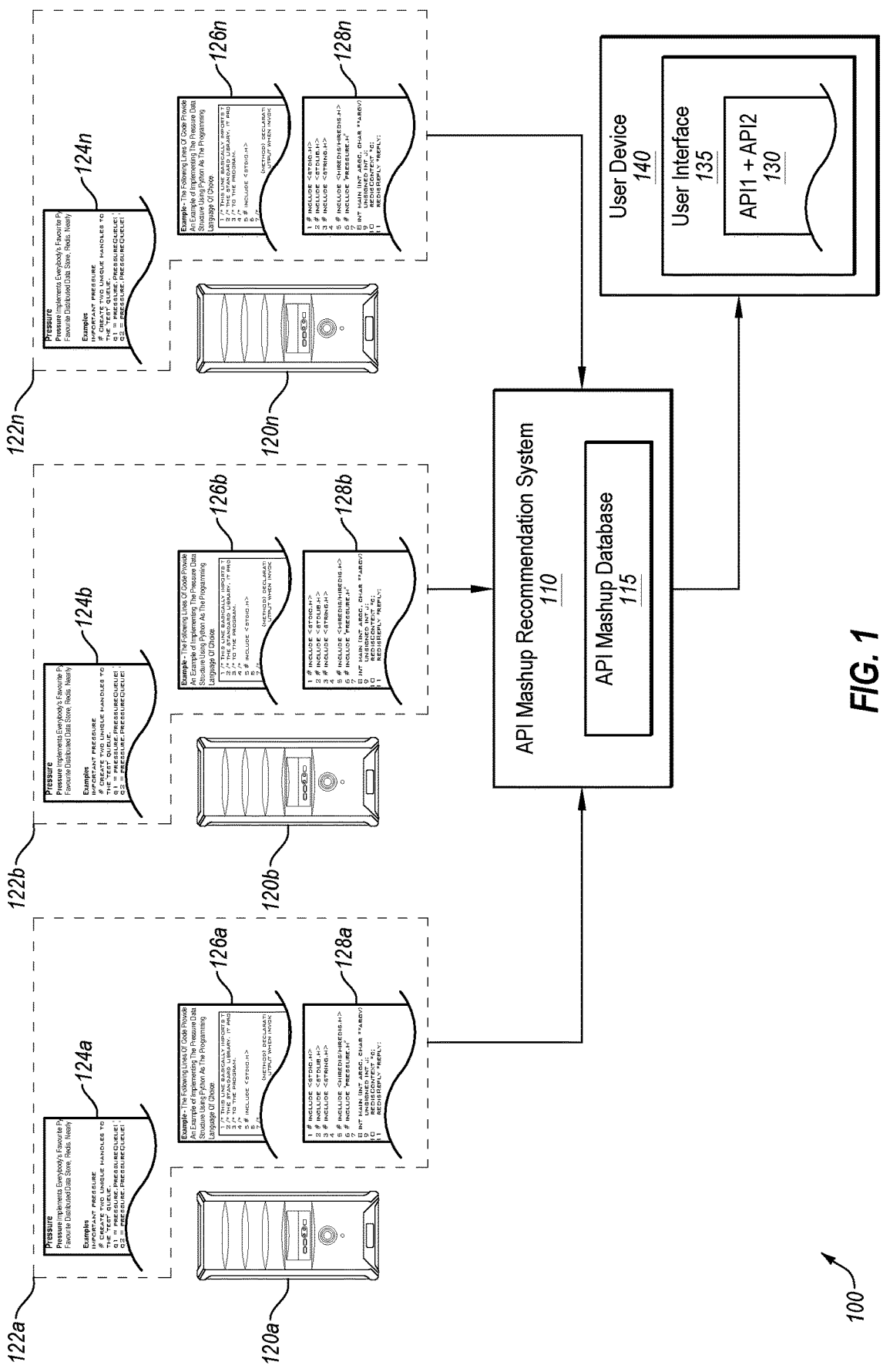
FIG. 1 illustrates an example system related to recommending an API mashup and exploring an API mashup database.

The present disclosure relates to, inter alia, the use of a computing device to analyze various software projects that utilize API mashups in the software projects to identify existing API mashups, create a reliable repository of API mashups, to enable a user to search the repository of API mashups efficiently, and in some instances, to receive a recommendation for a particular API mashup. For example, an API mashup recommendation system may parse or mine repositories of API mashups, to extract API usage data from the collected code samples, and to provide a user-interface which enables users to explore API mashups. This user interface enables developers to find API mashups based on keywords of real-world open-source project descriptions, the keywords of API descriptions, or API mashup popularity in various projects. As such, the system and methods described herein are designed to enable a user, such as a software developer, to find an API mashup that suits their desired needs efficiently and effectively. Further, in some embodiments, the system may be used to proactively recommend API mashups.

The ability to reliably and efficiently browse through an API mashup database may provide a number of benefits to the operation of a computer itself, and improvements to the related field of computer programming. With respect to the computer itself, the exploration and recommendation of a suitable API mashup from a reliable repository may provide the computer with improved functionality by allowing the computer to invoke and/or implement new functionality that has not existed before, and to generate such functionality in an automated manner. For example, the present disclosure may facilitate generation of computer software by identifying API mashups, each with distinct functionalities, and uses so as to enable a developer to implement an appropriate API mashup in various software applications. Thus, embodiments of the present disclosure may improve the performance of a computer itself.

With respect to improving computer programming, the present disclosure may provide enhanced capabilities for software development. For example, the present disclosure may facilitate the identification of computer source code in a manner that provides a more efficient and reliable repository of validated API mashups so as to enable software developers to more efficiently and reliably provide software solutions to their clients. Thus, embodiments of the present disclosure may improve computer programming.

More particularly, in many instances, finding a suitable API mashup for a software application is frustrating and time consuming due to the huge number of existing web APIs, and this number is rapid increasing. The search may include reading a large amount of API documentation and searching online websites in an attempt to identify an API mashup that is reliable and suitable for the particular application. One particular difficulty is that many of the existing APIs lack detailed documentation which may be used to guide software developers. Another difficulty is that even the open-source websites which host large repositories of source code including API mashups are not easily searchable according to real-world usage, keywords, or the like.

Embodiments of the present disclosure are explained with reference to the accompanying drawings.

FIG. 1 illustrates an example system 100 related to facilitating API mashup exploration and recommendation, in accordance with one or more embodiments of the present disclosure. The system 100 may include an API mashup recommendation system 110 including an API mashup database 115. The API mashup recommendation system 110 is configured to obtain information regarding one or more software projects 122 (such as the software projects 122a, 122b, . . . , 122n). In some embodiments the software projects 122a, 122b, and 122n may be stored in project servers 120, such as the project servers 120a, 120b, and 120n, respectively. The software projects may be available publicly (e.g., open-source projects) or privately to authorized users and applications. The software projects 122 may provide a set of functionality as implemented by computer source code. In these and other embodiments, the software projects 122 may include any of a description 124 of the software projects 122, snippets of code 126 used in the software project 122, and the actual computer source code 128 for implementing the software project 122. By analyzing the software projects 122a, 122b, . . . , 122n, the API mashup recommendation system 110 may identify API mashups which have been successfully used in various real-world applications. As used herein, the term API mashup may refer to a set of computer source code that include API calls to two or more APIs. There are many different types of API mashups, for example, one type of API mashup is used in a way that the output of one or more APIs is used as input for another API. In some embodiments, processing occurs on the output of one API in the API mashup 130 before being used as the input for another API. Another type of API mashups could be "if this then that" type of mashup, where one or more APIs are the trigger, and another API is the action. Once a particular condition is met, the action will be performed accordingly.

The API mashup recommendation system 110 may be a system, device, component, or combinations thereof configured to extract information regarding one or more software projects 122, determine correlations between one or more APIs of the software projects 122, generate an API mashup database 115, and identifying at least one suitable API mashup 130 based which is presented to a developer on a user interface 135 of a user device. The API mashup recommendation system may be implemented as a computing device, such as the computing device 1100 of FIG. 11, a software process or processes operating on such a computing device, etc. For example, based on detected correlations, the API mashup recommendation system 110 may generate an API mashup database 115 which may include computer source code that includes listing of identified and verified API mashups in a variety of real-world applications. Each API mashup includes, a first API call, optionally some processing on the output of the first API, and a second API call on the output (or processed output) of the first API.

In some embodiments, the API mashup recommendation system 110 may be configured to obtain information regarding the software project 122a. For example, the API mashup generator may download, crawl, or otherwise access the software project 122a as stored in the project server 120a. In these and other embodiments, the API mashup generator may extract information from one or more websites of the software project 122a. For example, the API mashup recommendation system 110 may extract pages with the description 124a, pages that may include the snippets 126a, and/or a page that may include the code 128a.

In some embodiments, the API mashup recommendation system 110 may analyze the extracted information to identify API calls within the software project 122a. For example, the API mashup generator 110 may parse the description 124a searching for the term "API," "API Mashup", API titles, or synonymous terms (e.g., "Application Programming Interface," "Third Party Function," "Third Party Resources," "Third Party Application Call," etc.). Additionally or alternatively, such terms may be identified in association with the snippet 126a and/or the code 128a. In some embodiments, the snippet 126a and/or the code 128a may be parsed or otherwise searched for a given hypertext transfer protocol (HTTP) function in proximity to a uniform resource locator (URL) or uniform resource identifier (URI). For example, the API mashup recommendation system 110 may search for a PUSH, POST, DELETE, PUT, etc. HTTP command proximate a URL or a URI, and may identify the combination as an API call.

In some embodiments, the API mashup recommendation system 110 may be configured to determine whether the API call identified in the software project 122a is associated with the introduction of a new API or the use of a preexisting API. For example, the API mashup recommendation system 110 may compare the API call to a list of known APIs, or may search the description 124a or the code 128a for terms indicative of the function of the API.

In some embodiments, the API mashup recommendation system 110 may extract data regarding the identified API calls. For example, the API mashup recommendation system 110 may extract, from the description 124a, the API title, the API URLs/URIs, the API host, endpoints, metadata, any examples of usage of the API, an installation guide for the API, any dependencies of the API (e.g., other functions/APIs that the API mashup relies upon, etc.). In these and other embodiments, the information associated with the identified mashup APIs may be used by the API mashup generator 110 to generate an API mashup database 115, which may then be used by the developer to search and identify a particular API mashup 130 which may be most popular or best suited for their particular project.

In some embodiments, the API mashup recommendation system 110 may analyze the code 128a of the software project 122a associated with the API calls of the API mashups to determine potential applications of API mashups and to validate the API mashups. In analyzing the code 128a, the API mashup recommendation system 110 may determine a programming language used in the identified API call. For example, the API mashup generator 110 may identify that the API call is in Javascript, Python, C #, C++, etc. In these and other embodiments, the API mashup recommendation system 110 may identify a particular syntax of code as associated with one language or another. Additionally or alternatively, the API mashup recommendation system 110 may be configured to identify multiple API calls in a single code file with multiple API calls and to perform API call slicing from the one code file. In another instance, the API mashup recommendation system 110 may perform API call code slicing from multiple code files 128a and 128b to identify all the lines of code and associated URLs using a given expression.

In some embodiments, in analyzing the code 128a, the API mashup recommendation system 110 may extract variables from the code 128a. The API mashup generator 110 may be configured to identify the type of variables (e.g., string, float, Unicode, etc.) and relationships between the variables (e.g., code that 'a=b' includes a relationship between 'a' and 'b' in that the value of variable 'b' is transferred to variable 'a'). In these and other embodiments, the different variable types and the different relationships may be dependent on the programming language used to generate the code 128a. The relationships may be depicted visually to identify relationships between variables, such as using a unified modeling language (UML).

Analyzing the code 128a by the API mashup recommendation system 110 may additionally include identifying usages for the API calls in the code 128a based on the types and relationships of the variables used in the code 128a. For example, the API mashup recommendation system 110 may determine what code is used to invoke the APIs and/or what variables are used as inputs and/or outputs of the API. The API mashup recommendation system 110 may additionally or alternatively identify processing that occurs on an input and/or on an output of the API. In these and other embodiments, for the code 128a, the API mashup recommendation system 110 may determine whether there are two or more variables used as direct inputs and/or outputs to APIs in the code 128a. An example of analyzing code may be described in greater detail with reference to FIGS. 3, 4A, 4B, and 5.

Modifications, additions, or omissions may be made to the system 100 without departing from the scope of the present disclosure. For example, the system 100 may include any number of software projects stored on any number of project servers. In some embodiments, a much larger number of software projects may be included.

For each of the methods illustrated in FIGS. 2-5, the methods may be performed by any suitable system, apparatus, or device. For example, the API mashup recommendation system 110 of FIG. 1, or other systems or devices may perform one or more of the operations associated with the methods. Although illustrated with discrete blocks, the steps and operations associated with one or more of the blocks of the methods may be divided into additional blocks, combined into fewer blocks, or eliminated, depending on the desired implementation.

Additionally, for each of the methods illustrated in FIGS. 2-5, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 2:
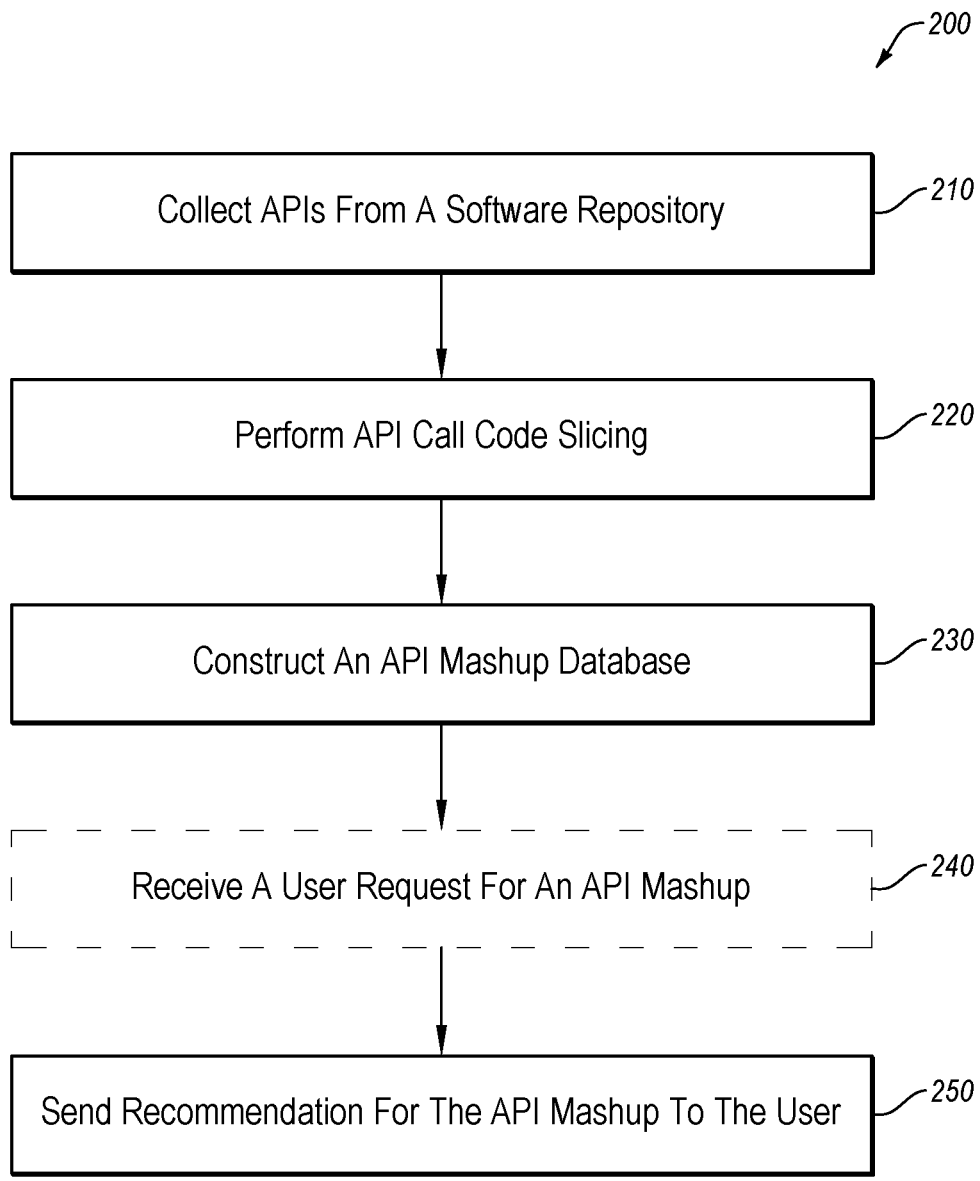
FIG. 2 illustrates a flowchart of an example method of generating an API mashup recommendation.

FIG. 2 illustrates a flowchart of an example method 200 of providing user exploration and recommendation of API mashups, in accordance with one or more embodiments of the present disclosure.

At block 210, one or more API usage repositories or software repositories are searched or crawled to identify, download a local copy of, or otherwise extract information regarding a plurality of APIs and mashup APIs which are available and commonly used in software projects. The extracted information may include any of a plain text description of various software projects (e.g., the functionality of the software project, the inputs/outputs of the software project, etc.), snippets of code of the project (e.g., potentially nested within the description with accompanying description of the function of the snippets of code), and code for implementing the software project. In some embodiments, the block 210 may be repeated multiple times across multiple software projects.

One example of a repository which may be called is GITHUB®, which although other open source software repositories or websites may be used. The software repository may also be a website which is in communication with the API mashup recommendation system 110 via a network connection, such as an internet connection. One example of a method for performing block 210 may be described more fully in FIG. 3.

At block 220, API calls in the extracted information may be identified and API call code slicing may be performed. For example, the API mashup recommendation system 110 may parse the extracted information to identify API calls. For example, the API mashup recommendation system 110 may search for the term "API", or API titles, or for synonymous terms in the description or snippets of code. Additionally or alternatively, the API mashup recommendation system 110 may search the code for lines of code known to implement an API call in a given programming language (such as a certain HTTP command proximate a URL or a URI). In some embodiments, if the API call is identified in the document or snippets of code, the API mashup recommendation system 110 may locate the identified API call in the code. One example of an API call code slicing is described further with respect to FIGS. 4A and 4B.

At block 230, the API mashup recommendation system 110 generates an API mashup database 115. More specifically, the code is analyzed to identify and verify the inputs and outputs of the mashup APIs and to identify real-world usages of the code. In one embodiment, an example of a method for creating an API mashup database 115 is described with respect to FIG. 5.

As is described more fully below, the API mashup database 115 may then be used by a user, such as a software developer, to explore or navigate a plurality of available API mashups in order to identify an API mashup that is most suited for a particular software application. In some instances this may involve block 240, during which a user request for a suitable API mashup may be received. According to one embodiment, this request may include specific criteria that are desired by the user, such as keywords, programming language, specific code repositories, host URL, endpoint, or the like. Based on the search criteria, at block 250 a recommended API mashup 130 is then sent to the user via the user interface 135 of the user device 140.

In another embodiment, the API mashup recommendation system 110 may recommend an API mashup 130 or a listing of suitable API mashups based on contextual information, such as a previously selected keyword, language, endpoint, or the like. It should be understood that in this context, a passive search is not performed by the user but rather contextual information about the user's needs is inferred from the context of the software development being performed in the user interface 135.

FIGS. 3, 4A, 4B, and 5 may illustrate various examples of methods of collecting APIs from a software repository, performing API code slicing and analysis of the retrieved API code so as to create a searchable mashup API database 115 that may be utilized by a user to discover, explore, search various API mashups as they are being used in various real-world applications so as to identify an API mashup which is suitable or best suited for their particular needs. Each of the methods of FIGS. 3, 4A, 4B, and 5 may generate computer source code such that a computing device may execute the computer source code generated in the methods of 3, 4A, 4B, and 5 to identify, verify, and navigate API mashups.

Figure 3:
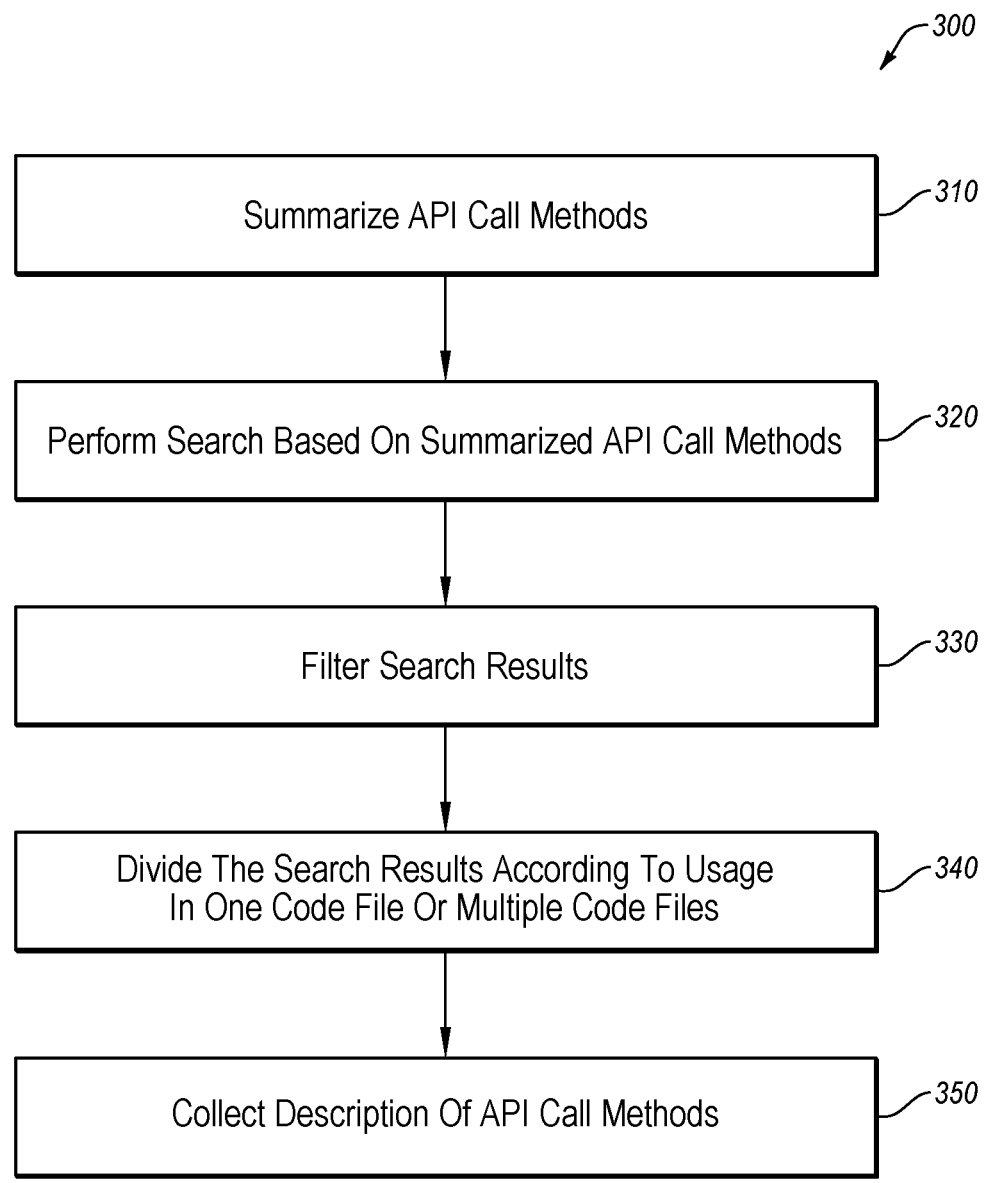
FIG. 3 illustrates a flowchart of another example method of collecting a plurality of API code from a repository.

FIG. 3 illustrates a flowchart of an example method 300 of collecting API and API mashup code in one or more API usage repositories.

At block 310, for a given programming language, the API call methods are summarized. Examples of known API call methods in, for example, JavaScript include $.ajax, $.getJSON, $.post, and XMLHttpRequest, although others may be used and other API call methods of other programming languages may also be used.

Based on the summarized API call methods, at block 320, a seed search string is performed on a software repository, such as GITHUB®. One example of how the seed search may be used is described in U.S. patent application Ser. No. 15/374,798 entitled "API LEARNING," which is herein incorporated by reference in its entirety. In one example, the seed search may comprise a dataset which may include API host URL, API title, endpoints of the API, and the API description. The search result includes the software project/code which has API call.

At block 330, the results of the search are then filtered according to various criteria in order to identify API mashups. In one example, the criteria include filtering the results so that the results include at least two API call methods, since an API mashup requires at last two API calls. In some instances another criteria which must be satisfied in block 330 is that the API calls are included in a seed API dataset used in the seed search string.

At block 340, the filtered results are then divided into two categories based on whether there are multiple API call methods used in a single code file, or whether there are multiple API call methods used in multiple code files within a single API repository. Depending on this determination, a corresponding API call code slicing process is performed. For example, FIG. 4A illustrates on example of an API call code slicing process 400 which may be performed when multiple API calls are used in one code file, whereas FIG. 4B illustrates an example of an API call code slicing process 450 which may be performed from multiple code files within a single repository which have multiple API calls.

At block 350, the description of projects with the collected and filtered API calls is retrieved from the repository.

Figure 4A:
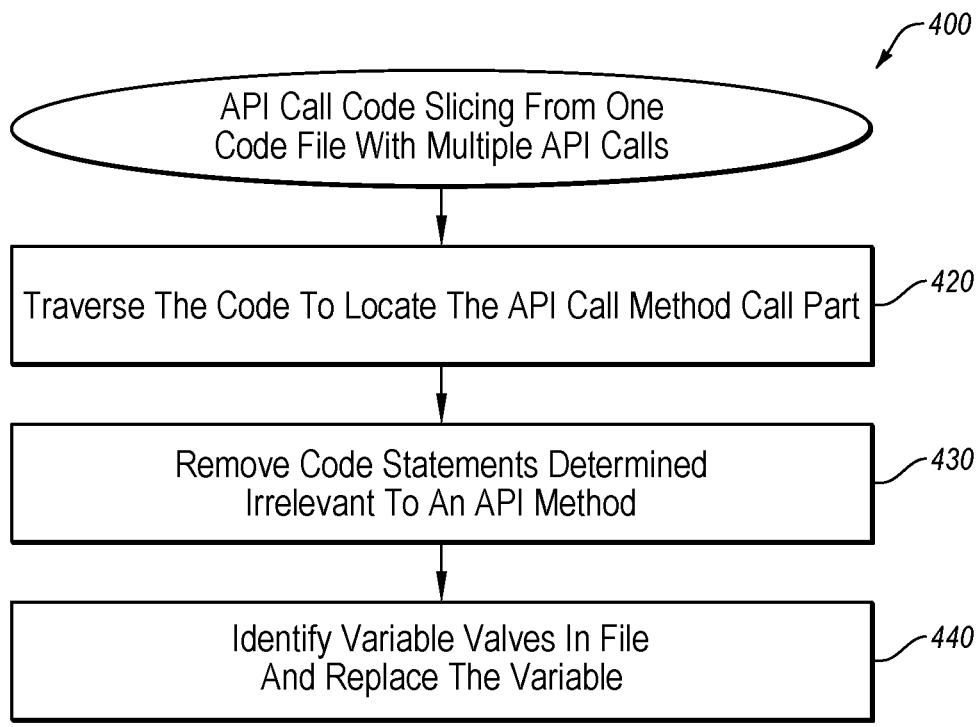
FIG. 4A illustrates a flowchart of performing API call code slicing according to a first embodiment.
Figure 4B:
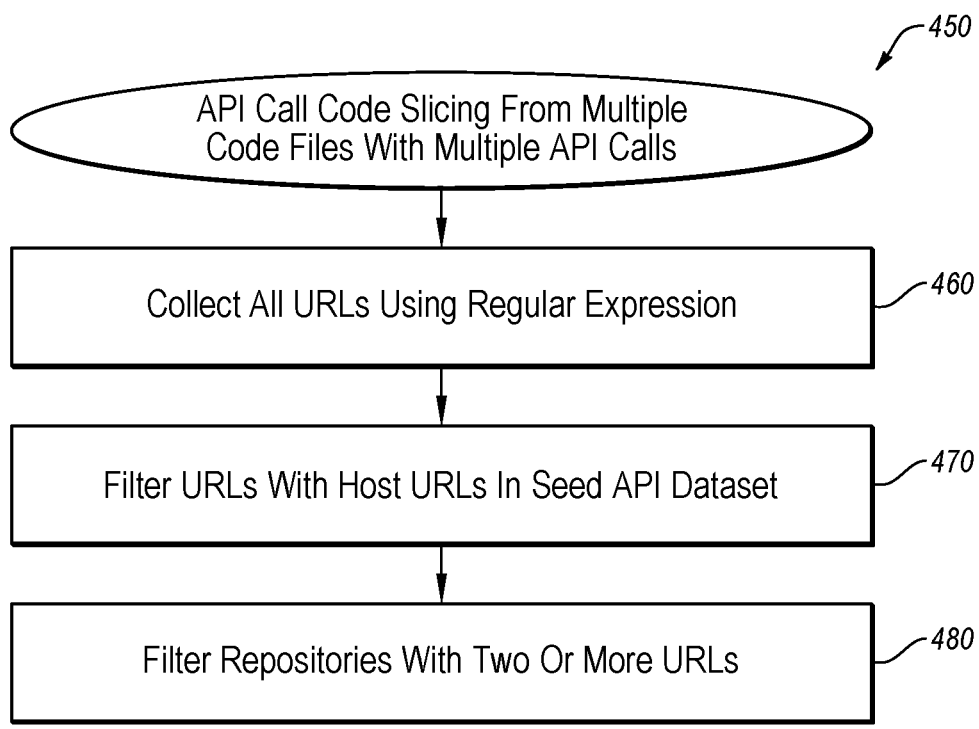
FIG. 4B illustrates a flowchart of performing API call code slicing according to a second embodiment.

FIGS. 4A and 4B are flowcharts showing example methods 400 and 450 of API call code slicing which may be performed on the API call code which has been retrieved and filtered as described above and in accordance with one or more embodiments of the present disclosure.

For an API call code comprising a single code file with multiple API calls, at block 420, the API call code is traversed to locate the API call method and code part. This may involve traversing the abstract syntax trees of the code file. At block 430, a string match method is used to locate code inside the API call method to remove code statements which are irrelevant to the API call at interest. At block 440, variables within code from a software project may be extracted and replaced if the variable is in the collected API call code.

For an API call code comprising multiple code files with multiple API calls within a single repository, at block 460, all URLs in the repository are collected using a regular expression. The collected URLs are then filtered with all host URLs in the seed API dataset at block 470. Then at block 480, the repositories are then filtered to identify API calls with two or more URLs to collect mashups, as a mashup has at least two API calls.

Figure 5:
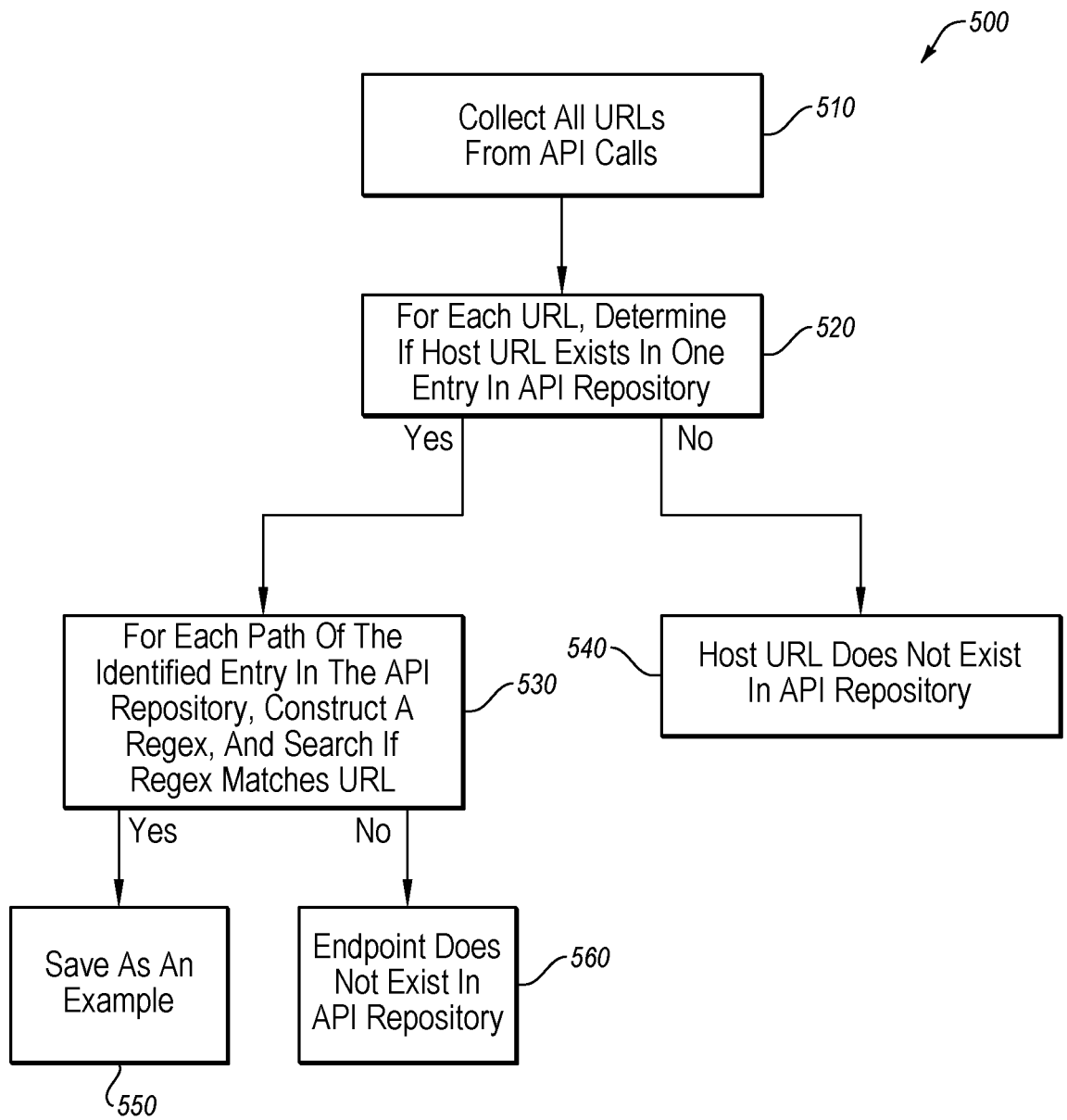
FIG. 5 illustrates a flowchart of performing the construction of an API database according to an example method.

FIG. 5 is a flowchart showing an example method 500 of constructing an API mashup database 115 based on the results of the API collection and API call code slicing described above. In one embodiment, the API mashup database may only store the valid API mashups, which means there are at least 2 valid API calls in the software repository, either in one code file or multiple code files but same project. An API call is valid when both the host URL and at least one endpoint for this API are identified in the software code. Each API mashup in the API mashup database 115 includes information about the API host URL and the associated endpoint, as well as the mashup co-occurrence frequency in the collected repository. At block 510, all the URLs collected in the API call code slicing are collected. At block 520, for each URL, it is determined whether the host URL exists in one entry in the API repository. If it is determined that the host URL exists in one entry in the API repository, then at block 530, for each path of the identified entry in the API repository, a regular expression (regex) is created, and it is determined whether the regex matches the URL and corresponding endpoint. If the regex matches the URL, then the API mashup is saved in the API mashup database 115 at block 550. If at block 530, it is determined that the regex does not match to the URL, then it is determined that the endpoint does not exist in the API repository at block 560.

Returning to block 520, if it is determined that the host URL does not exist in one entry in the API repository, then at block 540 it is determined that the host URL does not exist in the API repository.

Returning to block 550, in some instances, the API mashup database 115 comprises a listing of various API mashups, each of which includes two different API host URLs. In one embodiment, the API mashup database 115 creation may also involve recording the frequency at which a specific API and endpoint are used in the various repositories. As such, the API mashup database 115 not only includes a variety of different API matchups which are used in various "real world" applications, the API mashup database 115 may also record the co-occurrence of the API mashup and various combinations of API mashups in the repositories.

One example of a software algorithm which may be utilized to implement some aspects of the method 500 is shown below:

```
{
    "api_info": [
        {
            "endpoint": "/media/{media-id}",
            "host": "api.instagram.com"
        },
        {
            "endpoint": "/users/{USER_ID}/checkins",
            "host": "api.foursquare.com"
        }
    ],
    "count": 3
},
```

Figure 6:
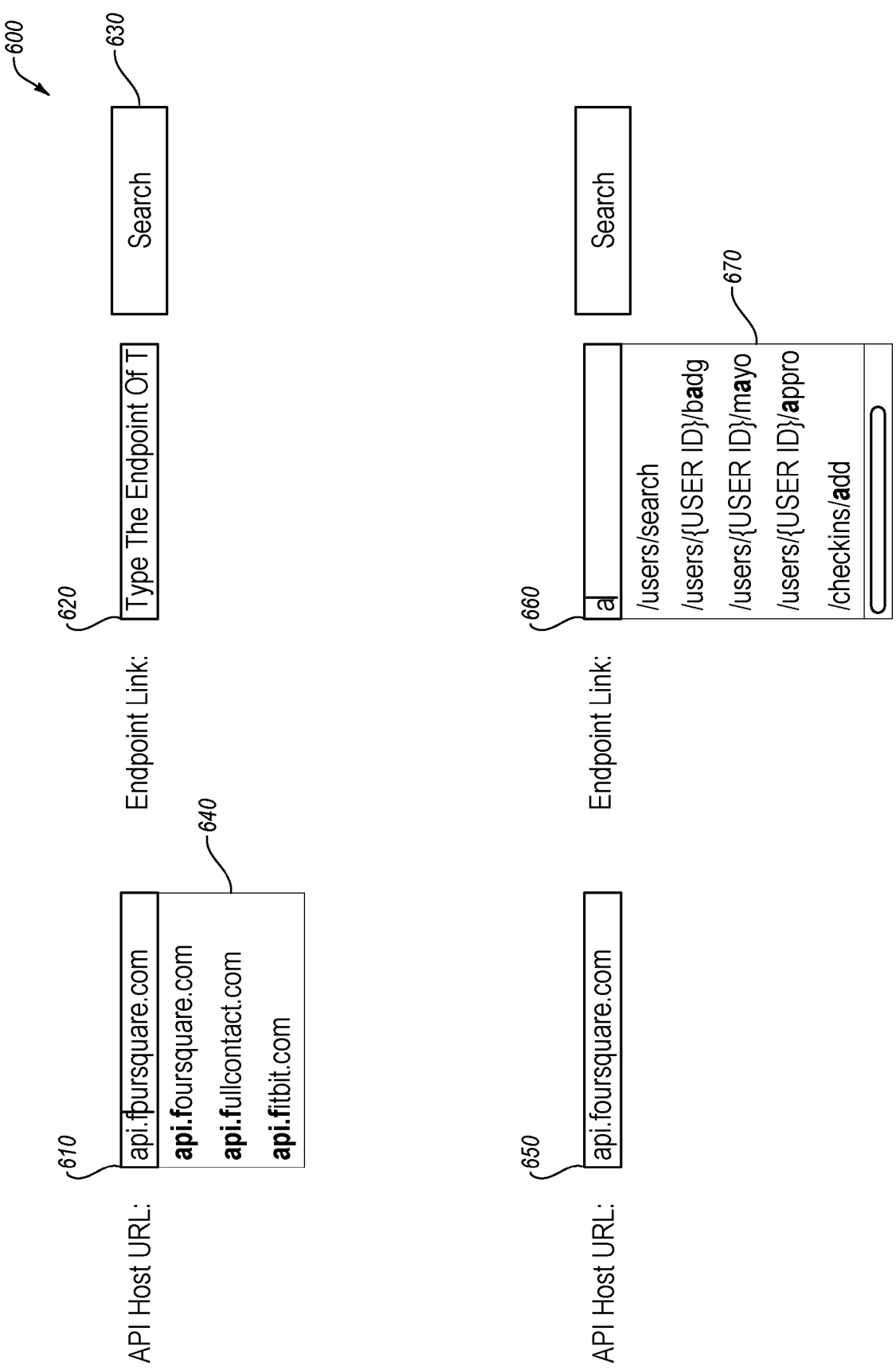

FIG. 6 is an example of a user interface 600 which may be used for API mashup exploration when used in association with the API mashup recommendation system 110 described above.

In the user interface 600 shown in FIG. 6, a developer uses the entry box 610 to select an API host URL. In the embodiment shown in FIG. 6, the user interface 600 includes an auto-complete function so as to generate a listing 640 of predictive API host URL options. In the user interface, entry box 650 indicates that the user has selected "api.foursquare.com" The user interface 600 also includes an entry box 620 for enabling the user to select an endpoint link, which (shown in 660) may also use predictive auto-completion so as to provide a listing 670 of likely endpoint links for the give API Host URL. The user interface 600 may also include a search button 630 which would initiate the search.

Figure 7:
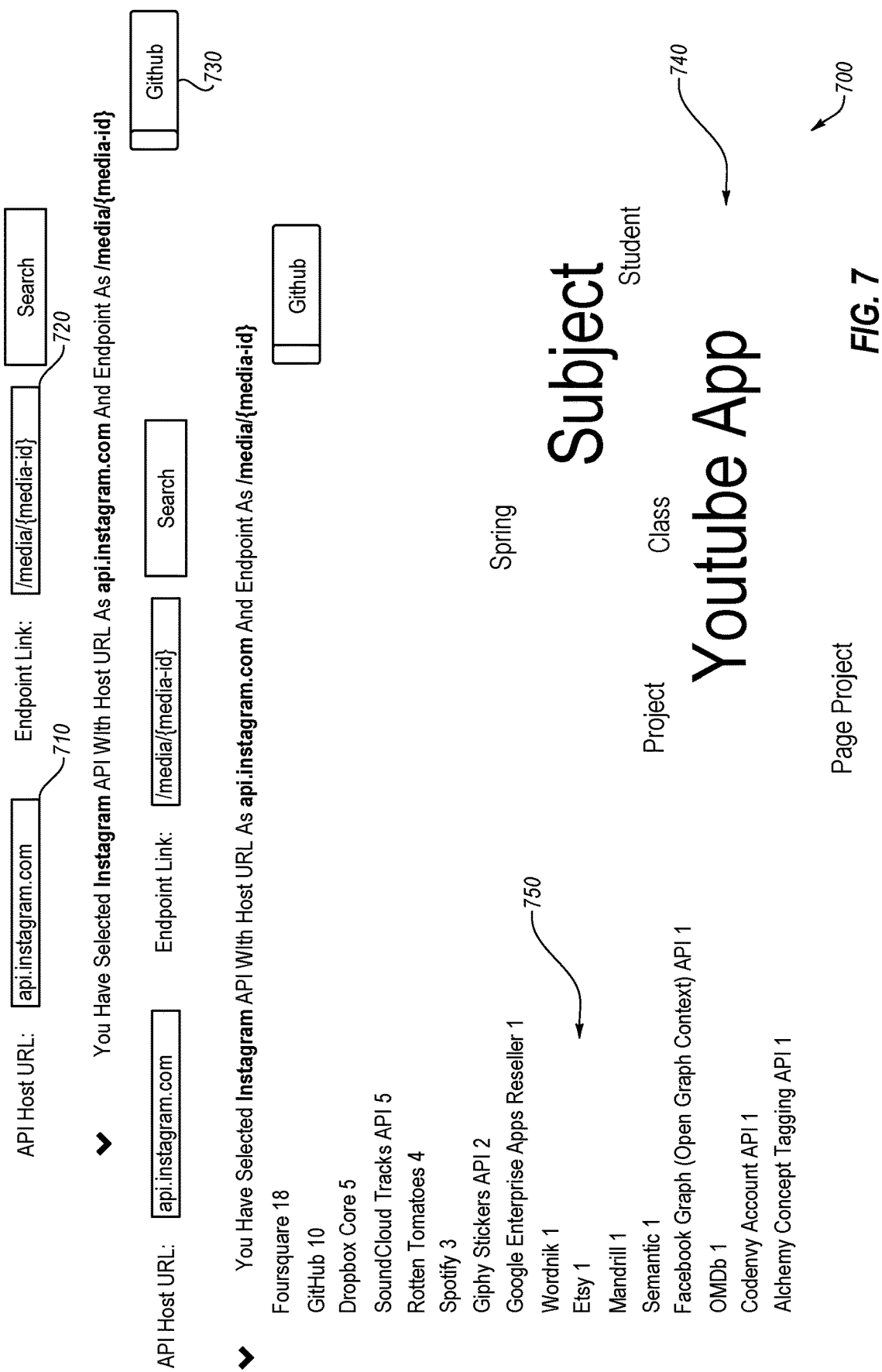

Upon clicking the search button 630, the user interface may, for example, change to the interface 700 shown in FIG. 7, which includes a listing 750 of available API options to form a mashup, given the user defined API Host URL 710 and Endpoint 720. In addition, for a given repository (shown as Github 730), the selected API Host URL and the endpoint may also be summarized as a keyword cloud 740 of various project keywords from the collected project descriptions of the given repository, as computed by a noun phrase extraction algorithm (which is available with many open source natural language processing toolkits such as NLTK or Spacy). The larger font in the word cloud means that such keywords are more common in the repository. In the example shown in FIG. 7, the listing 750 of available API mashups may be presented according to frequency of use in the API mashup dataset.

Figure 8:
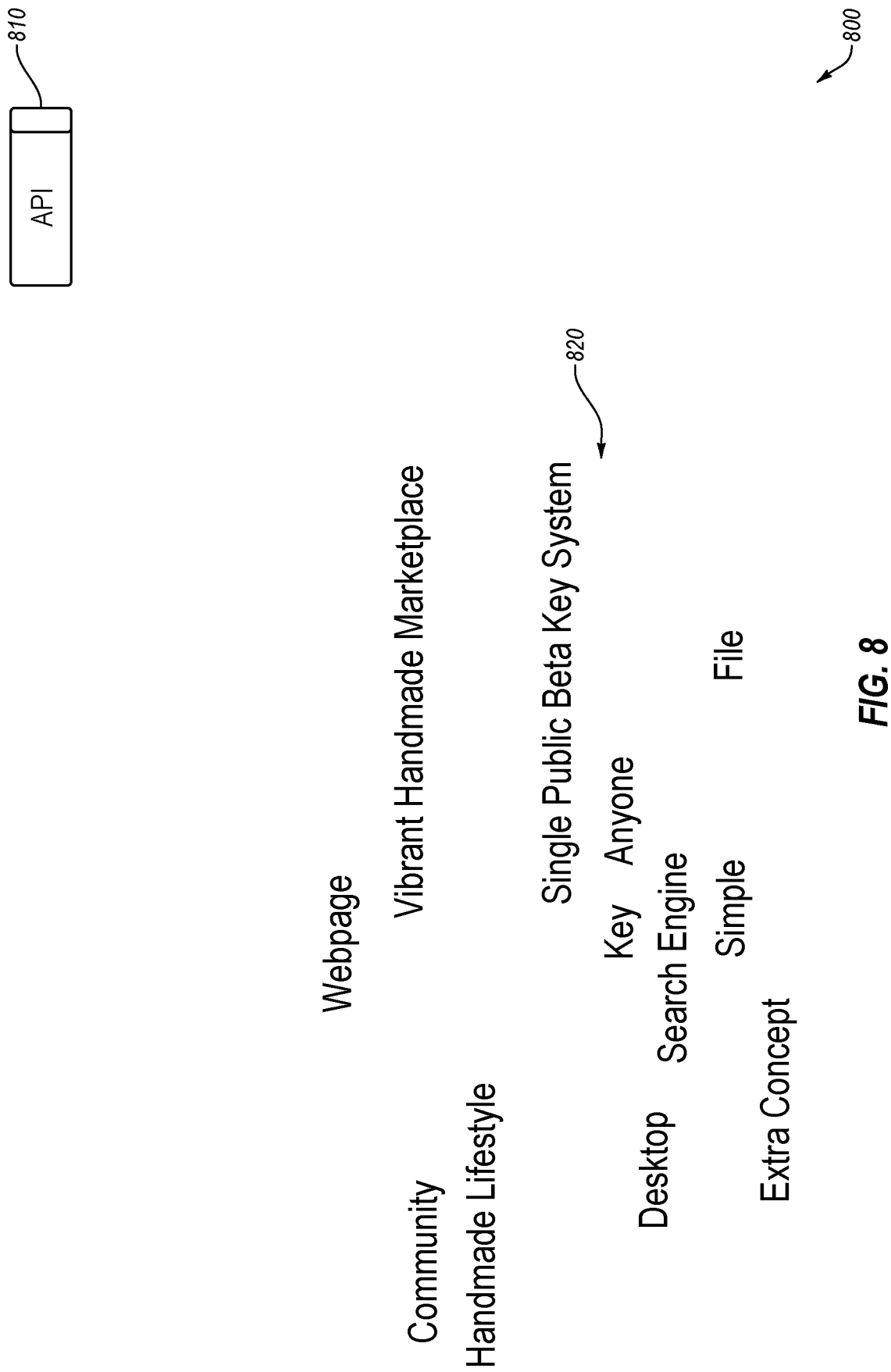

FIG. 8 is an example of another user interface 800 which may be provided, which provides a button 810 for users to switch to a word cloud 820 of API keywords corresponding to the descriptions of the other APIs that can be used to combine as a mashup with the selected API in 710.

FIG. 9 is an example of another user interface 900 wherein a user is able to click on a mashup API title in a listing 930 of mashup APIs, which will cause the selection of API mashup with the previously inputted API and endpoint. In another embodiment, the user can select a description keyword 910, which will cause the selection of mashup API options which have a co-occurrence with the inputted API host URL and endpoint in the repositories including the selected keyword. Similarly, clicking on an API description from the keyword cloud 920 will cause the selection of mashup API options where the selected keyword is included in the description text.

A user can then select a filtered API title (in this example ranked by API mashup popularity), repository keyword, or API description keyword to identify a particular mashup API. Then as is shown in FIG. 10, the interface 1000 will then show a listing of all the endpoint options 1010 of the specified mashup API along with a real-world open source repository title. Users can then click on the title to open the repository link the browser.

In addition to the user-interfaces described above, it should be understood that other interfaces may be used in association with the API mashup database 115 and API mashup recommendation system 110. More particularly, the system may also support active API mashup recommendation based on contextual information. For example, if a project is using one API endpoint and there are a listing of keywords relating to the project, based on the keywords, a list of available (and most popular) API mashups may also be proactively recommended to the user.

One benefit of the API mashup recommendation system described herein is that the API mashups are recommended based on "ground-truth" real-world open source projects. Through the analysis of a very large number of software projects, and checking both the host URL and endpoints, the system can guarantee that those API mashups are valid. This enables developers to learn directly from code examples used in various other software applications. Furthermore, the collected API mashup database can also be used to improve the diversity of existing API mashup systems. Additionally, developers can quickly sort through the API mashups in the database using keywords or popularity in the software repository. Some embodiments also provide endpoint level API mashup recommendation whereas existing API mashup systems such as PROGRAMMABLEWEB® only provides API level mashups. Further the user interface described herein enables an efficient hierarchical searching mechanism which allows user to explore API mashups efficiently.

In some embodiments, the system and methods described herein may also provide API mashups based on the frequency of their usage or popularity in real-world applications. This also enables users to better understand API mashup usage.

Figure 11:
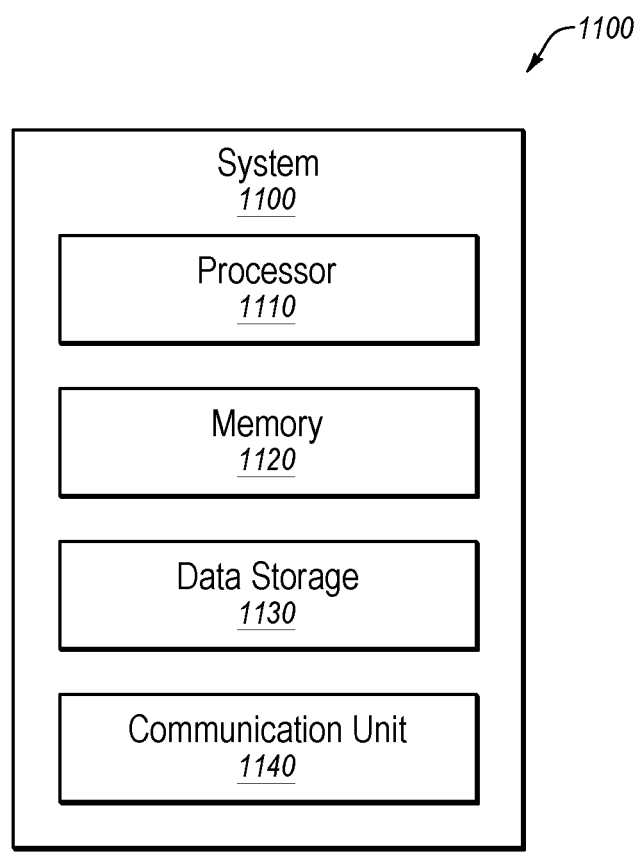
FIG. 11 illustrates an example computing system.

FIG. 11 illustrates an example computing system 1100, according to at least one embodiment described in the present disclosure. The system 1100 may include any suitable system, apparatus, or device configured to communicate over a network. The computing system 1100 may include a processor 810, a memory 1120, a data storage 1130, and a communication unit 1140, which all may be communicatively coupled. The data storage 1130 may include various types of data, such as software projects, API documents, computer source code, etc.

Generally, the processor 1110 may include any suitable special-purpose or general-purpose computer, computing entity, or processing device including various computer hardware or software modules and may be configured to execute instructions stored on any applicable computer-readable storage media. For example, the processor 1110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 11, it is understood that the processor 810 may include any number of processors distributed across any number of network or physical locations that are configured to perform individually or collectively any number of operations described in the present disclosure. In some embodiments, the processor 1110 may interpret and/or execute program instructions and/or process data stored in the memory 1120, the data storage 1130, or the memory 1120 and the data storage 1130. In some embodiments, the processor 1110 may fetch program instructions from the data storage 1130 and load the program instructions into the memory 1120.

After the program instructions are loaded into the memory 1120, the processor 1110 may execute the program instructions, such as instructions to perform the methods 200, 300, 400, 450, or 500 of FIGS. 2, 3, 4A, 4B, and 5, respectively. For example, the processor 1110 may obtain instructions regarding extracting information from various software projects, identifying a machine-readable API mashup of two APIs and recommending a suitable API mashup to the user.

The memory 1120 and the data storage 1130 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1110. In some embodiments, the computing system 1100 may or may not include either of the memory 1120 and the data storage 1130.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1110 to perform a certain operation or group of operations.

The communication unit 1140 may include any component, device, system, or combination thereof that is configured to transmit or receive information over a network. In some embodiments, the communication unit 1140 may communicate with other devices at other locations, the same location, or even other components within the same system. For example, the communication unit 1140 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 1140 may allow the system 1100 to communicate with other systems, such as computing devices and/or other networks.

Modifications, additions, or omissions may be made to the system 1100 without departing from the scope of the present disclosure. For example, the data storage 1130 may be multiple different storage mediums located in multiple locations and accessed by the processor 1110 through a network.

As indicated above, the embodiments described in the present disclosure may include the use of a special purpose or general purpose computer (e.g., the processor 1110 of FIG. 11) including various computer hardware or software modules, as discussed in greater detail below. Further, as indicated above, embodiments described in the present disclosure may be implemented using computer-readable media (e.g., the memory 1120 or data storage 1130 of FIG. 11) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   collecting a plurality of computer-readable source code from an application programming interface (API) repository;
   performing API call code slicing on the computer-readable source code to identify API call codes from the computer-readable source code, the API call code slicing comprising, for an API call code comprising multiple code files with multiple API calls within a single project:
      collecting a plurality of Uniform Resource Locator (URL)s in the multiple code files;
      filtering the plurality of URLs to identify a plurality of host URLs; and
      filtering the multiple code files to identify code files which include the plurality of host URLs and which include two or more URLs;
   extracting an API host and an endpoint for each of the API call codes identified in the API call code slicing;
   compiling an API mashup database based on the extracted API host and endpoints, the API mashup database including a plurality of API mashups wherein each respective API mashup:
      relates to a corresponding software program;
      includes a plurality of respective API's used by the corresponding software program;
      indicates a corresponding host and endpoint for each respective API; and
      indicates a usage relationship between the respective API's of the respective API mashup; and
   providing a recommended API mashup of the API mashup database in a user interface.

2. The method of claim 1, wherein the API repository comprises GITHUB®.

3. The method of claim 1, wherein collecting the plurality of computer-readable source code comprises:
   identifying a plurality of API call methods for a programming language;
   performing a code search operation on the API repository using the identified API call methods of the programming language; and
   filtering the results of the code search operation to identify code files including two or more API calls.

4. The method of claim 3, wherein collecting the plurality of computer-readable source code further comprises:
   identifying single code files in the results of the code search operation including two or more API calls; and
   identifying multiple code files for a single project in the results of the code search operation including multiple API calls.

5. The method of claim 1, wherein the API call code slicing comprises:
   for an API call code comprising a single code file identified as including two or more API calls:
      traversing an abstract syntax tree of the single code file to locate the API call code in the single code file; and
      removing code statements in the single code file which are irrelevant to the API call code.

6. The method of claim 1, further comprising:
   receiving user-defined search parameters for a recommended API mashup from a user,
   wherein the recommended API mashup is further recommended based on the user-defined search parameters.

7. The method of claim 6, wherein the user-defined search parameters are selected from a group including host URL, endpoint, API keyword, and API repository.

8. One or more non-transitory computer-readable media containing instructions, which, when executed by one or more processors, cause a system to perform operations, the operations comprising:
   collecting a plurality of computer-readable source code from an application programming interface (API) repository;
   performing API call code slicing on the computer-readable source code to identify API call, the API call code slicing comprising, for an API call code comprising multiple code files with multiple API calls within a single project:
      collecting a plurality of Uniform Resource Locator (URL)s in the multiple code files;
      filtering the plurality of URLs to identify a plurality of host URLs; and
      filtering the multiple code files to identify code files which include the plurality of host URLs and which include two or more URLs;
   extracting an API host and an endpoint for each of the API call codes identified in the API call code slicing;
   compiling an API mashup database based on the extracted API host and endpoints, the API mashup database including a plurality of API mashups wherein each respective API mashup:
      relates to a corresponding software program;

includes a plurality of respective API's used by the corresponding software program;

indicates a corresponding host and endpoint for each respective API; and indicates a usage relationship between the respective API's of the respective API mashup; and providing a recommended API mashup of the API mashup database in a user interface.

9. The computer-readable media of claim 8, wherein the API repository comprises GITHUB®.

10. The computer-readable media of claim 8, wherein collecting the plurality of computer-readable source code comprises:

identifying a plurality of API call methods for a programming language;

performing a code search operation on the API repository using the identified API call methods of the programming language; and filtering the results of the code search operation to identify code files search including two or more API calls.

11. The computer-readable media of claim 10, wherein collecting the plurality of computer-readable source code further comprises:

identifying single code files in the results of the code search operation including two or more API calls; and identifying multiple code files for a single project in the results of the code search operation including multiple API calls.

12. The computer-readable media of claim 8, wherein API call code slicing comprises:

for an API call code comprising a single code file identified as including two or more API calls:

traversing an abstract syntax tree of the single code file to locate the API call code in the single code file; and removing code statements in the single code file which are irrelevant to the API call code.

13. The computer-readable media of claim 8, the operations further comprising:

receiving user-defined search parameters for a recommended API mashup from a user, wherein the recommended API mashup is further recommended based on the user-defined search parameters.

14. The computer-readable media of claim 13, wherein the user-defined search parameters are selected from a group including host URL, endpoint, API keyword, and API repository.

15. A system comprising:

one or more processors; and one or more non-transitory computer-readable media containing instructions, which, when executed by one or more processors, cause a system to perform operations, the operations comprising:

collecting a plurality of computer-readable source code from an application programming interface (API) repository;

performing API call code slicing on the computer-readable source code to identify API call codes from the computer-readable source code, the API call code slicing comprising, for an API call code comprising multiple code files with multiple API calls within a single project:

collecting a plurality of Uniform Resource Locator (URL)s in the multiple code files;

filtering the plurality of URLs to identify a plurality of host URLs; and filtering the multiple code files to identify code files which include the plurality of host URLs and which include two or more URLs;

extracting an API host and an endpoint for each of the API call codes identified in the API call code slicing;

compiling an API mashup database based on the extracted API host and endpoints, the API mashup database including a plurality of API mashups wherein each respective API mashup:

relates to a corresponding software program;

includes a plurality of respective API's used by the corresponding software program;

indicates a corresponding host and endpoint for each respective API; and indicates a usage relationship between the respective API's of the respective API mashup; and providing a recommended API mashup of the API mashup database in a user interface.

16. The system of claim 15, wherein collecting the plurality of computer-readable source code comprises:

identifying a plurality of API call methods for a programming language;

performing a code search operation on the API repository using the identified API call methods of the programming language; and filtering the results of the code search operation to identify code files search including two or more API calls.

17. The system of claim 16, wherein collecting the plurality of computer-readable source code further comprises:

identifying single code files in the results of the code search operation including two or more API calls; and identifying multiple code files for a single project in the results of the code search operation including multiple API calls.

18. The system of claim 15, wherein the operations further comprise:

receiving user-defined search parameters for a recommended API mashup from a user, wherein the recommended API mashup is further recommended based on the user-defined search parameters.

* * * * *